(12) United States Patent
Murphy

(10) Patent No.: US 9,596,958 B1
(45) Date of Patent: Mar. 21, 2017

(54) FREE-STANDING BARBECUE GRILL COVER SET

(71) Applicant: Jeffrey M. Murphy, Maple Ridge (CA)

(72) Inventor: Jeffrey M. Murphy, Maple Ridge (CA)

( * ) Notice: Subject to any disclaimer, the term of this patent is extended or adjusted under 35 U.S.C. 154(b) by 113 days.

(21) Appl. No.: 14/538,398

(22) Filed: Nov. 11, 2014

Related U.S. Application Data

(60) Provisional application No. 61/974,075, filed on Apr. 2, 2014.

(51) Int. Cl.
*A47J 37/07* (2006.01)

(52) U.S. Cl.
CPC ................... *A47J 37/0786* (2013.01)

(58) Field of Classification Search
CPC ........ A47J 37/07; A47J 37/0786; B65D 65/02
USPC ........ 206/818, 320; 126/25 R; 150/154, 165, 150/166; 24/303, 581.1, 581.11, DIG. 30; 335/306; 248/309.4
See application file for complete search history.

(56) References Cited

U.S. PATENT DOCUMENTS

| | | | | |
|---|---|---|---|---|
| 2,574,709 A | * | 11/1951 | Rizzolo | A41H 9/02 33/9 R |
| 2,639,751 A | * | 5/1953 | Flaherty | B60J 11/00 114/361 |
| 5,067,618 A | * | 11/1991 | Johnson | A47G 25/06 211/85.3 |
| 5,245,801 A | | 9/1993 | Boesvert | |
| 5,251,362 A | * | 10/1993 | Riceman | H01F 7/0263 24/303 |
| 5,405,004 A | * | 4/1995 | Vest | B25H 3/06 206/350 |
| 5,474,185 A | * | 12/1995 | Franke | B65D 65/02 150/158 |
| 5,497,819 A | * | 3/1996 | Chiang | B60J 11/00 150/166 |
| D377,136 S | * | 1/1997 | Knuth | |
| 5,737,880 A | | 4/1998 | Hayes et al. | |
| 6,058,658 A | | 5/2000 | Dunn | |
| 6,152,487 A | * | 11/2000 | Crick | B60J 11/06 280/770 |
| 6,328,083 B1 | | 12/2001 | Esterson et al. | |
| D466,752 S | | 12/2002 | Rowe et al. | |
| 6,863,100 B2 | | 3/2005 | Neal et al. | |
| 7,152,733 B2 | | 12/2006 | Trickett | |
| 7,377,077 B2 | | 5/2008 | Rebeck | |

(Continued)

*Primary Examiner* — Sue A Weaver
(74) *Attorney, Agent, or Firm* — Robert C. Montgomery; Montgomery Patent & Design, LP.

(57) ABSTRACT

A grill cover set having a lower skirt assembly for extending around the lower portions of a grill and an upper cover assembly for covering the top of the grill. The skirt assembly has an upper perimeter with circumferentially disposed double magnets, a tunnel adjacent the upper perimeter, one (1) end defined by a left seam and another end defined by a right seam. The upper cover assembly has a lower perimeter edge with circumferentially disposed single magnets. A cable passes through the tunnel and is used for clinching the skirt assembly to the grill. A cable tensioner holds the cable together. At least one (1) double magnet is positioned so as to align with at least one (1) single magnet when the skirt assembly and the upper cover assembly are on the grill. The lower skirt assembly has recesses to enable access to parts of the grill.

14 Claims, 7 Drawing Sheets

(56) References Cited

U.S. PATENT DOCUMENTS

| | | | |
|---|---|---|---|
| 7,866,358 B1* | 1/2011 | Simms, II | A47J 37/0786 126/201 |
| 2007/0176462 A1* | 8/2007 | Lombardo | B60J 11/00 296/136.1 |
| 2007/0283946 A1* | 12/2007 | Maruzzo | A47J 37/0786 126/50 |
| 2007/0295223 A1 | 12/2007 | Reischmann et al. | |
| 2012/0247446 A1 | 10/2012 | Cross | |
| 2012/0266857 A1 | 10/2012 | Lin | |

* cited by examiner

US 9,596,958 B1

FREE-STANDING BARBECUE GRILL COVER SET

RELATED APPLICATIONS

This application claims the benefit of U.S. Provisional Application No. 61/974,075, which was filed Apr. 2, 2014, the entire disclosures of which are incorporated herein by reference.

FIELD OF THE INVENTION

The presently disclosed subject matter is directed to outdoor grilling products. More particularly, it is directed to a grill cover set that attaches to a grill.

BACKGROUND OF THE INVENTION

Spending time in the great outdoors is among the most popular fair weather leisure time activities for millions of people. Quite often cooking and enjoying a meal are parts of that outdoor activity. Probably the most popular outdoor cooking appliance is the grill. Whether it is a family gathering, a picnic, or just having a cookout, a great deal of time is spent around a barbeque grill.

Many people protect their barbecue grills from environmental damage by using canvas or vinyl covers. While such covers extend the life of a typical grill they are not without their disadvantages. First, large covers are extremely difficult to apply and remove when use of the barbecue grill is required. Next, there is seldom a suitable storage place for the grill cover when it is not on the grill. When not suitably stored the grill cover may blow away creating damage and possibly forcing a costly replacement. Finally, the entire grill cover must be removed as a single unit even if only access to part of the grill is needed.

Accordingly, there exists a need for a device that provides environmental protection for barbeque grill without the disadvantages described above. Beneficially such devices would be made available in multiple sizes to fit different sized grills. Preferably such devices would provide environmental protection for outdoor barbecue grills in a manner which is quick, easy, and effective.

SUMMARY OF THE INVENTION

The principles of the present invention provide for an improved grill cover set.

A grill cover set in accord with the present invention includes a skirt assembly for extending around lower portions of a grill. The skirt assembly has an upper perimeter with circumferentially disposed double magnets, a tunnel adjacent the upper perimeter, one (1) end defined by a left seam and another end defined by a right seam. Also included is an upper cover assembly for covering the top of a grill. The upper cover assembly has a lower perimeter edge with circumferentially disposed single magnets. A cable passes through the tunnel for clinching the skirt assembly to a grill. At least one (1) double magnet is positioned to align with at least one (1) single magnet when the skirt assembly and the upper cover assembly are on a grill.

Beneficially the grill cover set including a connector for securing the cable into a loop. Beneficially, the connector is a cable tensioner, preferably having a body with a first aperture that passes through the body, a second aperture that passes through the body, a first set screw for clamping the cable in the first aperture, and a second set screw for clamping the cable in the second aperture.

The skirt assembly usefully includes a left front half panel that ends in the left seam and a right front half panel that ends in the right seam. There may be a seam attachment for securing the left seam to the right seam. The left front half panel and the right front half panel can form an indented front recessed area when the left seam is secured to the right seam and possibly a rear panel having a rear recessed area. The seam attachment can include inner magnet fasteners and outer magnet fasteners. The double magnets may be arranged subjacent to and coextensively with the upper perimeter.

The upper cover assembly can have a top cover panel, a front cover panel, a first side cover panel, a second side cover panel, and a rear cover panel. The upper cover assembly may also include a front appendage along a bottom edge of the front cover panel and a rear appendage along a bottom edge of the rear cover panel. At least one (1) single magnet should be permanently affixed along the inner surface of the upper cover assembly via a rivet.

In practice the cable should be a wire-rope and each double magnet should have an inner magnet on an inner surface of the skirt assembly and an outer magnet on an outer surface of the skirt assembly. The inner magnet and the outer magnet should be connected by a rivet that passes through the skirt assembly and the inner magnet should be a flat rectangular magnet.

Another grill cover set in accord with the present invention includes a skirt assembly that extends around lower portions of a grill. That skirt assembly has an upper perimeter with circumferentially disposed double magnets that are attached to the reminder of the skirt assembly by a connector that passes though an inner magnet and an outer magnet. The skirt assembly also includes a tunnel adjacent the upper perimeter, a left end defined by a left seam and a right end defined by a right seam. An upper cover assembly covers the top of the grill. The upper cover assembly has a lower perimeter edge with circumferentially disposed single magnets that are attached to the remainder of the upper cover assembly by connectors. A cable passes through the tunnel clinching the skirt assembly to the grill and a cable connector secures the cable around the grill. The double magnets are aligned with the single magnets.

In the alternative embodiment the cable connector is a cable tensioner having a body having a first aperture that passes through the body, a second aperture that passes through the body, a first set screw that clamps the cable in the first aperture, and a second set screw that clamps the cable in the second aperture. The skirt assembly also includes a left front half panel that ends in the left seam, a right front half panel that ends in the right seam, and a magnetic seam attachment that secures the left seam to the right seam.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

Figure 1:
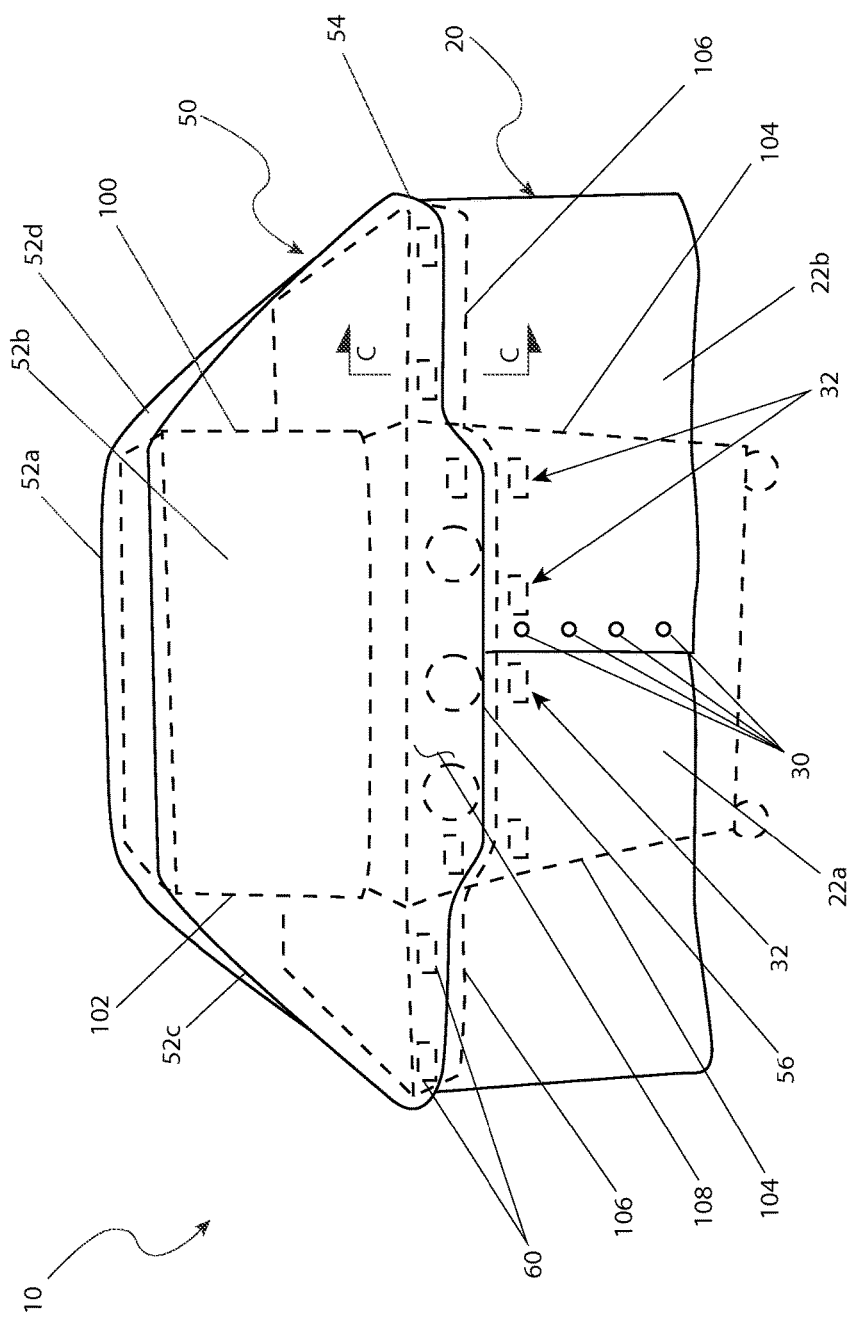
FIG. 1 is a front perspective view of a grill cover set 10 in accord with the preferred embodiment of the present invention depicted installation upon a grill 100.

DESCRIPTIVE KEY 10 grill cover set
20 skirt assembly
22a left front half panel
22b right front half panel
22c first side panel
22d second side panel
22e rear panel
24a left seam
24b right seam
26 front recessed area
28 rear recessed area
30 outer magnet fastener
31 inner magnet fastener
32 double magnet
32a inner magnet
32b outer magnet
40 cable
42 cable tunnel
44 cable tensioner
45 body
46a first aperture
46b second aperture
50 upper cover assembly
52a top cover panel
52b front cover panel
52c first side cover panel
52d second side cover panel
52e rear cover panel
54 perimeter edge
56 front appendage
58 rear appendage
60 single magnet
80 rivet fastener
82 set screw
84 threaded aperture
100 grill
102 grill hood
104 grill base
106 grill shelf
108 grill control panel

DETAILED DESCRIPTION OF THE PREFERRED EMBODIMENT

The preferred embodiment of the present invention is depicted within FIGS. 1 through 5. However, the invention is not limited to what is specifically illustrated and described. A person skilled in the art will appreciate that many other embodiments of the invention are possible without deviating from the basic concept of the invention. Any such work around also falls with the scope of this invention.

The terms "a" and "an" herein do not denote a limitation of quantity, but rather denote the presence of at least one (1) of the referenced items. In addition, unless otherwise denoted all directional signals such as up, down, left, right, inside, outside are taken relative to the illustration shown in FIG. 1.

Refer now to FIG. 1 for a front perspective view of a grill cover set 10 that is in accord with the present invention installed on an existing grill 100. The grill cover set 10 is comprised of two (2) pieces instead of a conventional single piece grill cover. By using two pieces it is possible to achieve reduced time and effort when uncovering and recovering the grill 100. The grill cover set 10 includes a lower skirt assembly 20 that extends around the lower portions of the grill 100, specifically including around a grill base 104 and a grill shelf 106.

Figure 2:
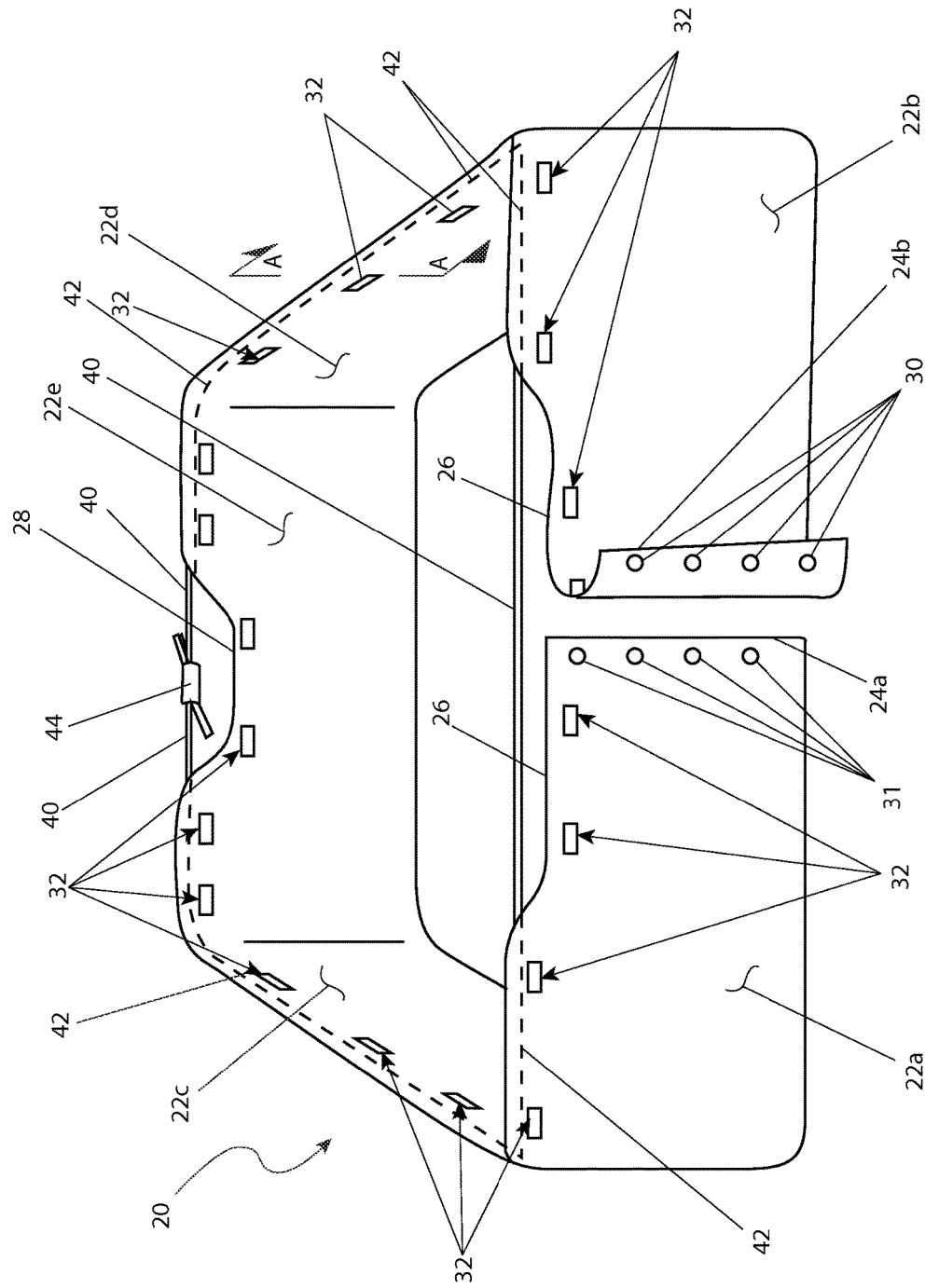
FIG. 2 is a perspective view of a skirt assembly 20 of the grill cover set 10 shown in FIG. 1.

Referring now also to FIG. 2, the skirt assembly 20 is held in place by cinching a cable 40 tightly around the grill 100. As used herein a cable refers to a line, cord, rope, chain, tie or other similar structure. The cable 40 is routed through a tunnel 42 formed along the upper perimeter edge of the skirt assembly 20. Using the cable 40 to attach the skirt assembly 20 to the grill 100 is especially useful when windy conditions are anticipated or if the grill 100 is made of a non-ferrous metal such as stainless steel to which magnets will not stick. The ends of the cable 40 are exposed and are adjustably joined in a rear recessed area 28 using a cable tensioner 44 (also see FIG. 5). The skirt assembly 20 has double magnets 32 (described in more detail subsequently and reference FIG. 4c) that are arranged subjacent to and coextensively with the upper perimeter edge of the skirt assembly 20. The double magnets 32 are useful for attaching the skirt assembly 20 to ferrous portions of a grill 100 if they are available.

Figure 3:
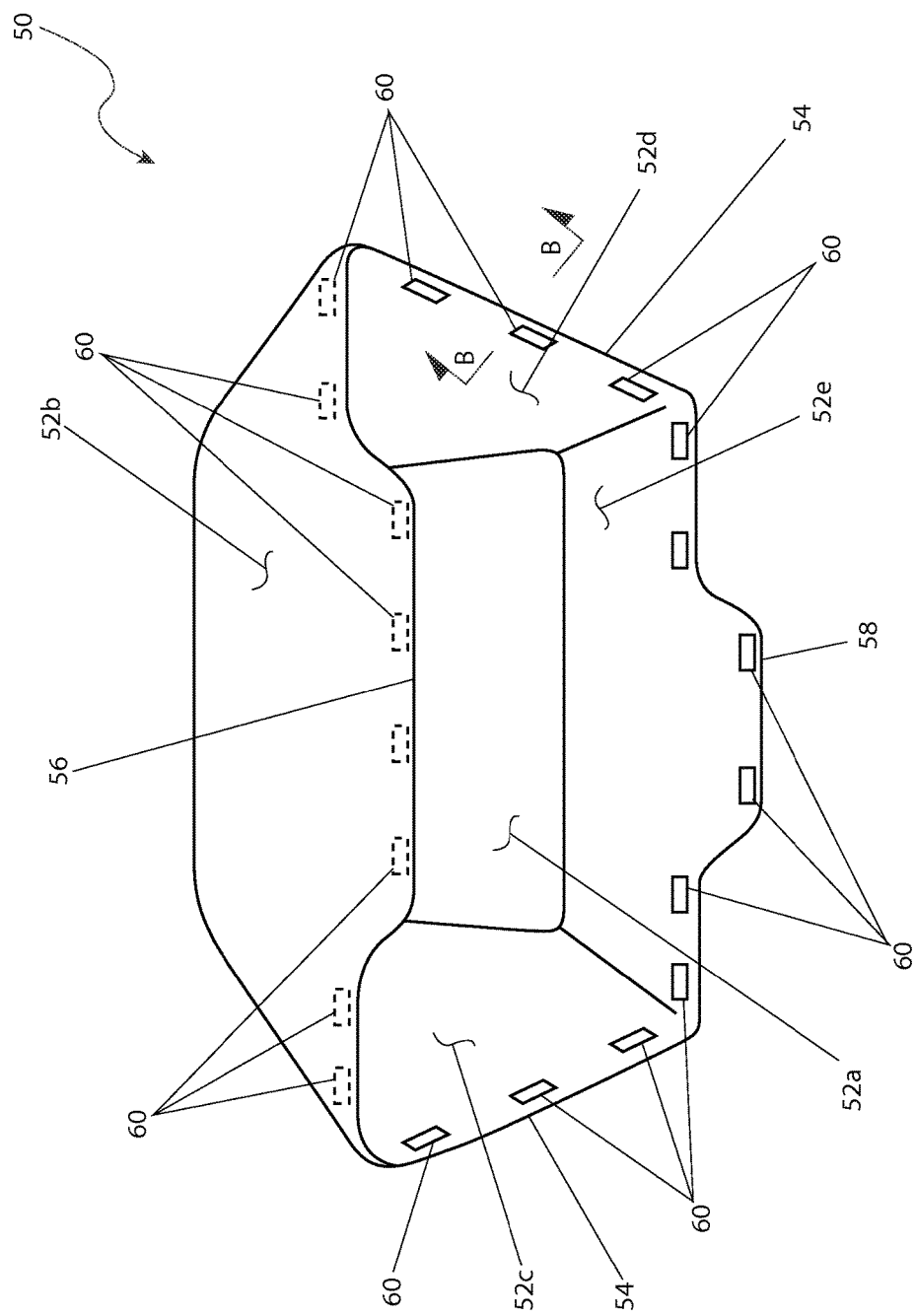
FIG. 3 is a bottom perspective view of an upper cover assembly 50 of the grill cover set 10 shown in FIG. 1.

Referring now to FIGS. 1 and 3, the grill cover set 10 also includes an upper cover assembly 50 that provides a protective covering for the top of the grill 100, specifically including a grill hood 102 and a grill shelf 106. The upper cover assembly 50 includes a plurality of single magnets 60 that are located subjacent to and coextensively with a lower perimeter edge 54 of the upper cover assembly 50. The single magnets 60 are positioned to attach to the aforementioned double magnets 32 of the skirt assembly 20. Magnetic attraction retains the upper cover assembly 50 securely to the lower skirt assembly 20.

The major portions of the skirt assembly 20 and upper cover assembly 50 are envisioned being made using a fire-retardant textile material and as being introduced in various attractive colors and patterns based upon a user's preferences. Furthermore, it is envisioned that the grill cover set 10 would be introduced in several sizes so as to fit over and around differently sized and shaped grills 100.

Referring now primarily to FIG. 2 (which has the upper cover assembly 50 removed), the skirt assembly 20 is a textile assembly approximately two to three feet (2-3 ft.) tall and which is arranged to wrap around and be cinched to the lower portions of the grill 100 via the previously described cable 40. The skirt assembly 20 wraps around the front, sides, and rear of the grill 100 ending at the front in a left front half panel 22a and a right front half panel 22b. The skirt assembly 20 also includes a first side panel 22c, a second side panel 22d, and a rear panel 22e. The front half panels 22a, 22b form a vertically indented front recessed area 26 along a center top edge which is intended to provide clearance for a forwardly protruding grill control panel 108 found on many popular models of grills 100. In a similar manner, the rear panel 22e forms a rear recessed area 28 along a center top edge to facilitate adjustment of the cable 40 as previously described below.

The front of the skirt assembly 20 is joined using a left seam 24a at the end of the left front half panel 22a and a right seam 24b at the front of a right front half panel 22b. The first 24a and second 24b seams are removably affixed to each other via respective inner magnet fasteners 31 and outer magnet fasteners 30. Preferably those fasteners comprise permanent magnets that are affixed to the seams 24a, 24b using methods such as, but not limited to: riveting, swaging, and the like. The seams 24a, 24b enable convenient access to the front of the grill base 106 to provide access to features such as cabinets, gas bottles, and the like.

The skirt assembly 20 is envisioned to being made using at least one (1) elongated sheet of fire-retardant fabric material such as NOMEX®, MARLAN®, MARKO®, or an equivalent fabric.

Refer now to FIG. 3 for a bottom perspective view of the upper cover assembly 50 of the grill cover set 10. The upper cover assembly 50 is envisioned as being made of a similar material as the previously described skirt assembly 20. The upper cover assembly 50 includes a plurality of fabric sections including a top cover panel 52a, a front cover panel 52b, a first side cover panel 52c, a second side cover panel 52d, and a rear cover panel 52e. The cover panels 52a, 52b, 52c, 52d, 52e are envisioned as being joined together using methods such as, but not limited to: sewing, heat-sealing, adhesive bonding, or the like, to form a dome-shaped form providing a contour-matching fit upon the grill hood 102 and the grill shelf 106 of the grill 100.

The upper cover assembly 50 also includes a plurality of single magnets 60 that are arranged along a lower perimeter edge 54 to provide magnetic attachment to outer magnets 32b of the aforementioned double magnet 32 of the skirt assembly 20. This holds the upper cover assembly 50 securely in place even in windy conditions (also see FIGS. 4b and 4c).

The upper cover assembly 50 further includes a front appendage 56 and a rear appendage 58 that are centered along bottom edges of the front cover panel 52b and the rear cover panel 52e, respectively. The appendages 56, 58 extend downward and preferably have profiles which match and cover the recessed areas 26, 28 of the skirt assembly 20. This provides for easy alignment and joining of the double magnets 32 and the single magnet 60 (see FIGS. 1, 2, and 4c).

Figure 4A:
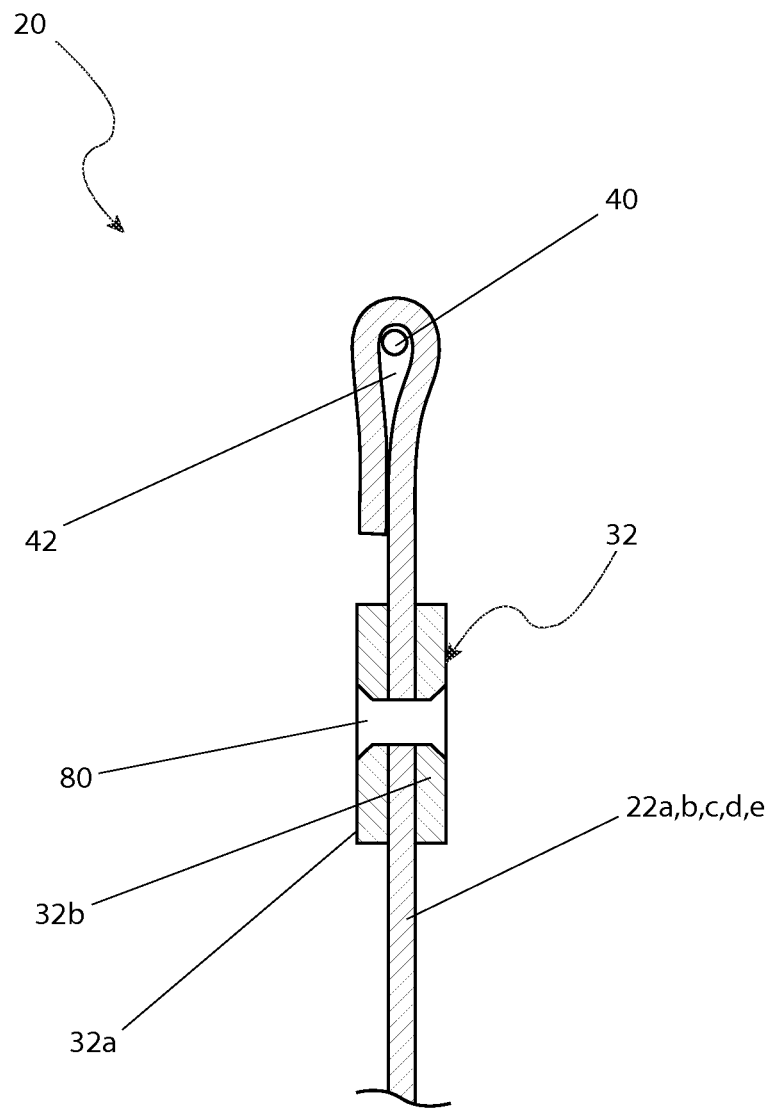
FIG. 4a is a sectional view of a cable tunnel 42 and a double magnet 32 of the skirt assembly 20 shown in FIG. 2 taken along section line A-A.

Refer now to FIG. 4a for a sectional view of the cable tunnel 42 and double magnets 32 of the skirt assembly 20 taken along section line A-A of FIG. 2. The top edges of the skirt assembly 20 retain the cable 40 that cinches the skirt assembly to and around the existing grill 100, or optionally magnetically attaches the skirt assembly 20 using the double magnets 32.

The cable tunnel 42 is formed by sewing the tunnel into the upper perimeter edge of the skirt assembly 20. The cable 40, beneficially a wire-rope-type cable, is routed through the tunnel. The ends of the cable 40 are joined together behind the grill 100 within the rear recessed area 28 using the cable tensioner 44 to secure the cable 40 with a desired tautness (also reference FIG. 5).

Each double magnet 32 is a pair of rectangular flat permanent magnets, an inner magnet 32a and an outer magnet 32b. The magnets 32a, 32b are affixed to opposing inner and outer surfaces of the skirt assembly 20 via a rivet fastener 80 or an equivalent fastening means. The rivet fastener 80 fastens both the magnets 32a and 32b and the panel of the skirt assembly 20 together.

Figure 4B:
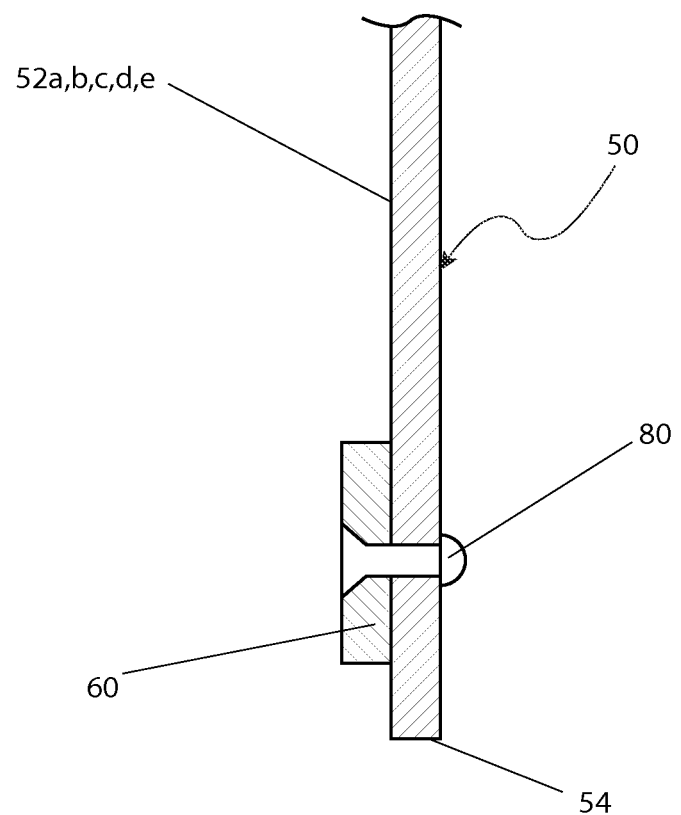
FIG. 4b is a sectional view of a single magnet 60 of the upper cover assembly 50 shown in FIG. 3 taken along section line B-B.

Refer now to FIG. 4b for a sectional view of a single magnet 60 of the upper cover assembly 50 taken along section line B-B of FIG. 3. A plurality of single magnets 60 are arranged so as to align with the double magnets 32 of the skirt assembly 20. Each single magnet 60 is a single magnet element similar to the magnets inner and outer magnets 32a and 32b of the double magnets 32. Each single magnet 60 is positioned and permanently affixed along the inner surface of the upper cover assembly 50 via a rivet fastener 80 or by another equivalent fastening means.

Figure 4C:
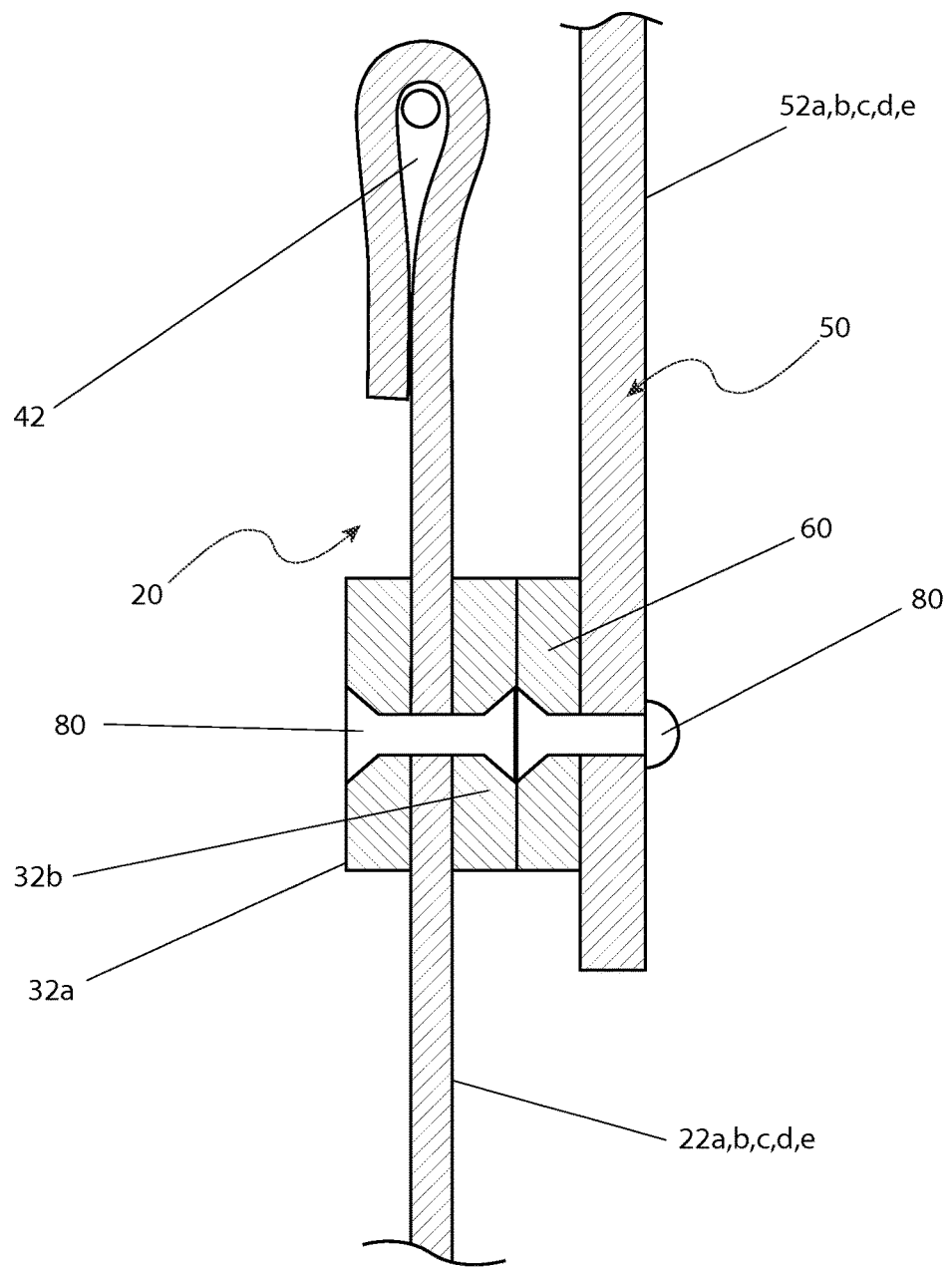
FIG. 4c is a sectional view of the double magnet 32 and the single magnet 60 in an attached state taken along section line C-C of FIG. 1; and, FIG. 5 is a partial break-away view of a cable tensioner 44 of the grill cover set 10 shown in FIG. 1.

Refer now to FIG. 4c for a sectional view of a double magnet 32 and a single magnet 60 taken along section line C-C of FIG. 3 when the double magnet 32 and the single magnet 60 are attached state.

Figure 5:
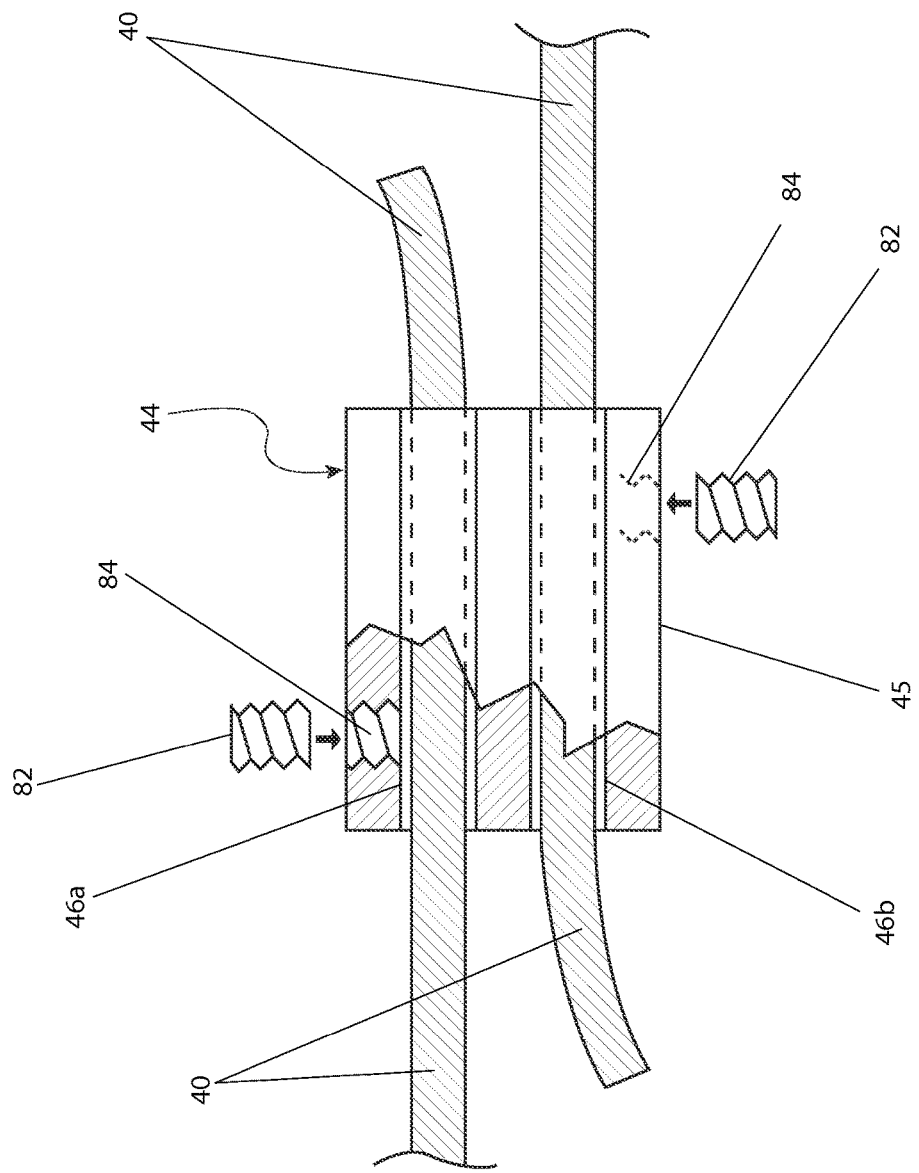

Refer now to FIG. 5 for a partial break-away view of the cable tensioner 44 of the grill cover set 10. The cable 40 is used to cinch and secure the skirt assembly 20 to the grill 100. The ends of the cable 40 are adjustably joined together within the rear recessed area 28, reference FIG. 2. The ends of the cable 40 are joined together via the cable tensioner 44. As illustrated, the cable tensioner 44 includes a rectangular or cylindrical body 45 having cylindrical first aperture 46a and second aperture 46b that are being molded or drilled through the body 45. The apertures 46a, 46b pass through the body 45 in parallel and are sized to allow easy sliding insertion of the ends of the cable 40. Preferably the ends pass through the body 45 in opposing directions. Once the ends of the cable 40 are through the apertures 26a, 26b the cable 40 is secured in position via set screws 82. The set screws 82 thread into threaded apertures 84 of the body 45. The set screws 82 and threaded apertures 84 are arranged to pinch the cable 40 within the apertures 26a, 26b. Tightening the set screws 82 results in clamping the cable 40 in position.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the grill cover set 10 it would be installed as indicated in FIG. 1.

The method of installing the grill cover set 10 may be performed by: procuring a model of the grill cover set 10 of a suitable size to fit over and around an existing grill 100 and with a desired fabric color to accent a user's preference and décor; wrapping the skirt assembly 20 around the lower grill base 104 of the grill 100 so as to center the first 24a and second 24b seams of the left front half panel 22a and right front half panel 22b on a front surface of the grill base 104; attaching the skirt assembly 20 to the grill 100 by routing the cable 40 through the cable tunnel 42; installing the cable tensioner 44 by inserting the ends of the cable 40 through respective apertures 46a, 46b of the cable tensioner 44 and pulling the cable 40 to a desired tautness; securing the cable 40 by tightening the set screws 82 until the cable 40 is securely clamped within the tensioner 44; attaching and closing the first 24a and second 24b seams together by mating the outer magnet fasteners 30 of the right seam 24b to corresponding inner magnet fasteners 31 of the left seam 24a; installing the upper cover assembly 50 by draping the upper cover assembly 50 over the top of the grill 100 including over the grill hood 102, grill shelf 106, and grill control panel 108; securing the upper cover assembly 50 in position by mating each single magnet 60 of the upper cover assembly 50 to the corresponding outer magnets 32b of each double magnet 32 of the skirt assembly 20; and benefiting from a secure and protective covering of one's grill 100 even during windy conditions afforded a user of the grill cover set 10.

In an event that the existing grill 100 has ferrous metal the skirt assembly 20 may be additionally or optionally affixed by securing the inner magnets 32a of each double magnet 32 to ferrous metal of the grill 100.

The method of using the grill cover set 10 during grilling may be achieved by: removing the upper cover assembly 50 of the grill cover set 10 by detaching the single magnets 32 of the upper cover assembly 50 and lifting the upper cover assembly 50 off the grill 100; grilling food stuffs; accessing the grill base 104 by detaching the first 24a and second 24b seams to enable tasks such as controlling or maintaining gas bottles or retrieving grilling utensils and tools; finishing grilling; allowing the grill 100 to cool; replacing the upper cover assembly 50 on the grill 100 as described above following; and benefiting from time and effort saved by only having to remove and re-install the upper cover assembly 50 of the grill cover set 10 when grilling.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A grill cover set, comprising:
   a skirt assembly for extending around lower portions of a grill, said skirt assembly having an upper perimeter and circumferentially disposed double magnets, a tunnel adjacent said upper perimeter, a left end defined by a left seam a right end defined by a right seam, a left front half panel that ends in said left seam, a right front half panel that ends in said right seam, and a seam attachment for securing said left seam to said right seam;
   an upper cover assembly for covering the top of a grill, said upper cover assembly having a lower perimeter edge and circumferentially disposed single magnets; and,
   a cable passing through said tunnel for clinching said skirt assembly to a grill;
   wherein said left front half panel and said right front half panel form an indented front recessed area when said left seam is secured to said right seam;
   wherein at least one double magnet is positioned to align with at least one single magnet when said skirt assembly and said upper cover assembly are on a grill.

2. The grill cover set of claim 1, further including a connector for securing said cable into a loop.

3. The grill cover set of claim 2, wherein said connector is a cable tensioner.

4. The grill cover set of claim 3, wherein said cable tensioner includes a body having a first aperture that passes through said body, a second aperture that passes through said body, a first set screw for clamping said cable in said first aperture, and a second set screw for clamping said cable in said second aperture.

5. The grill cover set of claim 1, wherein said skirt assembly further includes a rear panel having a rear recessed area.

6. The grill cover set of claim 1, wherein said seam attachment includes inner magnet fasteners and outer magnet fasteners.

7. The grill cover set of claim 1, wherein said double magnets are arranged subjacent to and coextensively with said upper perimeter.

8. The grill cover set of claim 7, wherein said upper cover assembly includes a top cover panel, a front cover panel, a first side cover panel, a second side cover panel, and a rear cover panel.

9. The grill cover set of claim 8, wherein said upper cover assembly further includes a front appendage along a bottom edge of said front cover panel and a rear appendage along a bottom edge of said rear cover panel.

10. The grill cover set of claim 9, wherein at least one single magnet is permanently affixed along the inner surface of the upper cover assembly via a rivet.

11. The grill cover set of claim 1, wherein said cable is a wire-rope.

12. The grill cover set of claim 1, wherein each double magnet comprises an inner magnet on an inner surface of said skirt assembly and an outer magnet on an outer surface of said skirt assembly.

13. The grill cover set of claim 12, wherein said inner magnet is connected to said outer magnet by a rivet that passes through said skirt assembly.

14. The grill cover set of claim 13, wherein said inner magnet is a flat rectangular magnet.

* * * * *